Oct. 18, 1938.  S. H. RANSOM, JR., ET AL  2,133,926
HEAT TREATMENT OF WELDED JOINTS
Filed June 13, 1936  2 Sheets-Sheet 1

SAMUEL H. RANSOM JR.
AND
GEORGE C. FAIRBAIRN
INVENTORS

BY R. J. Dearborn
THEIR ATTORNEY

Oct. 18, 1938.   S. H. RANSOM, JR., ET AL   2,133,926
HEAT TREATMENT OF WELDED JOINTS
Filed June 13, 1936   2 Sheets-Sheet 2
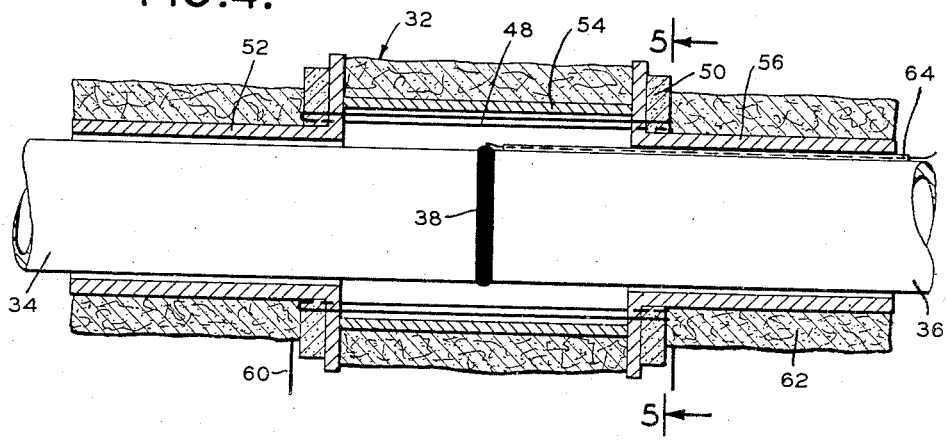
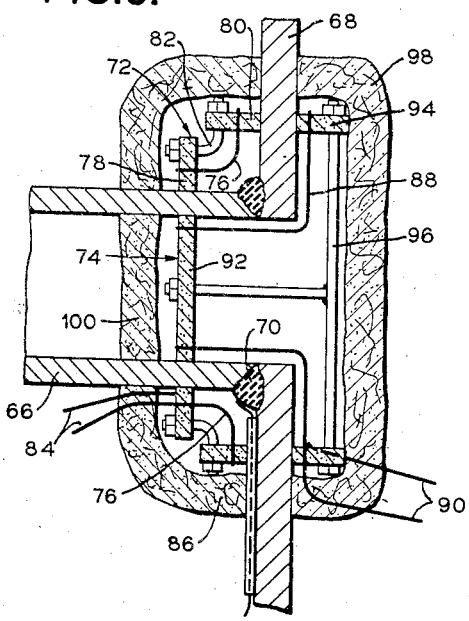
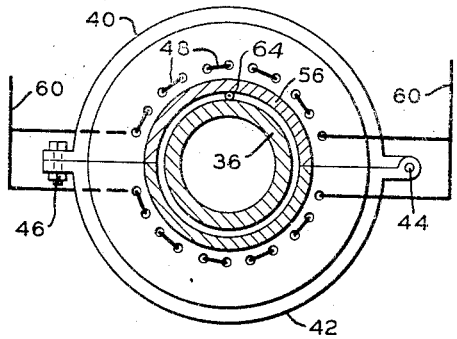
SAMUEL H. RANSOM JR.
AND
GEORGE C. FAIRBAIRN
INVENTORS
BY R. J. Dearborn
THEIR ATTORNEY Patented Oct. 18, 1938

2,133,926

UNITED STATES PATENT OFFICE 2,133,926

HEAT TREATMENT OF WELDED JOINTS

Samuel H. Ransom, Jr., and George C. Fairbairn, Port Arthur, Tex., assignors to The Texas Company, New York, N. Y., a corporation of Delaware Application June 13, 1936, Serial No. 85,003

2 Claims. (Cl. 148—21.5)

This invention relates to a method and apparatus for the heat treatment of welded joints in pipes or other steel plates or structures, to produce a joint of strong uniform structure having physical properties similar to those of the connected pipes or plates.

In forming welded joints which are permitted to cool in an uncontrolled manner, as by being subjected to air cooling, the structure of the weld and the connection of the weld with the adjacent metal of the welded structure forms an undesirable mass of heterogeneous structure which may be immediately or later fractured due to stresses set up in the materials. The desirable uniformity and homogeneity of structure and desirable physical properties such as toughness and resistance to shock are accordingly lacking.

The invention is particularly applicable to the treatment of welded joints between corrosion-resisting steel or other metal pipes containing a small percentage of alloying elements such, for example, as chromium or molybdenum. In petroleum equipment, pipes and tanks containing from 4 to 6 percent chromium are in general use and it is in the welding of tubes or plates of this type that the greatest difficulty with present welding methods is encountered.

It has been found especially difficult to join two tubular members or one tubular member to a plate or to the side of a larger tube by welding, due to the fact that the metal deposited in the weld is not all deposited at the same instant and the weld is cooled without properly controlling the temperature. Unequal cooling thus occurs and this causes small cracks to develop in the weld. This condition is more pronounced when alloy steel tubes or plates are to be welded, particularly those having a small chromium or molybdenum content, for example from 4 to 6 per cent.

In accordance with the present invention, the weld is formed in the usual manner by the deposit of molten metal in a preformed groove between the parts to be welded. The weld and adjacent metal are then immediately treated in accordance with the present invention in the formation of a strong, uniform weld.

The apparatus disclosed herein can be constructed and used with a minimum expenditure for equipment since it is adapted to receive current from the usual electric arc-welding equipment having a motor generator for supplying electric current at various voltages for forming the initial weld. The cost of the present equipment, above the cost of the usual arc-welding equipment is nominal.

Referring to the drawings illustrating typical examples of the invention,

Fig. 4 is a view similar to Fig. 2 showing tubes welded end to end, but with an exterior heating element.

Fig. 5 is a transverse sectional view on the line 5—5 of Fig. 4.

Fig. 6 is a sectional view illustrating the invention applied to a weld between a tube and a plate or large pipe, for example a still wall.

Figure 1:
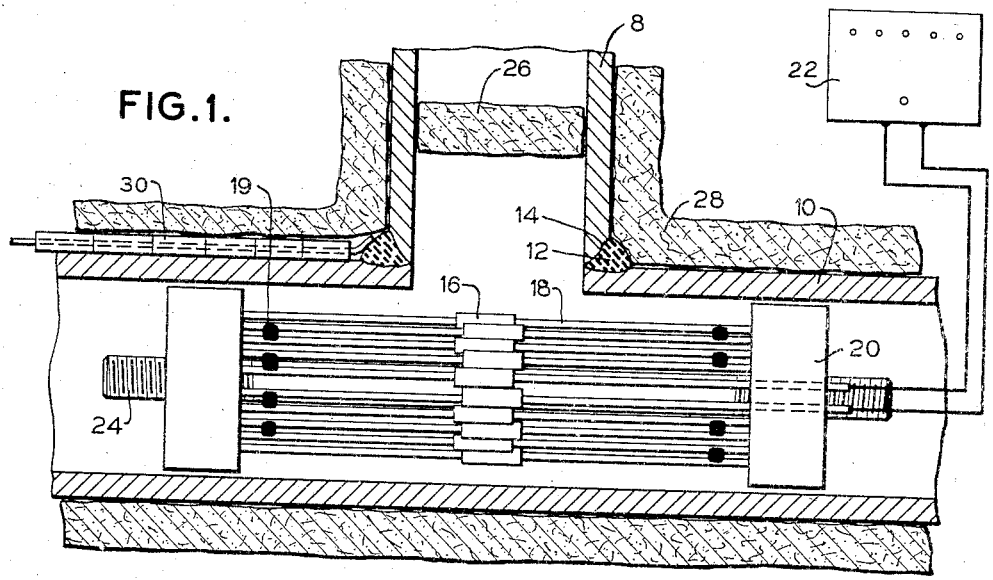
Fig. 1 is a longitudinal sectional view of a T weld of steel pipes, illustrating one application of our invention with an interior heating unit.
Figure 2:
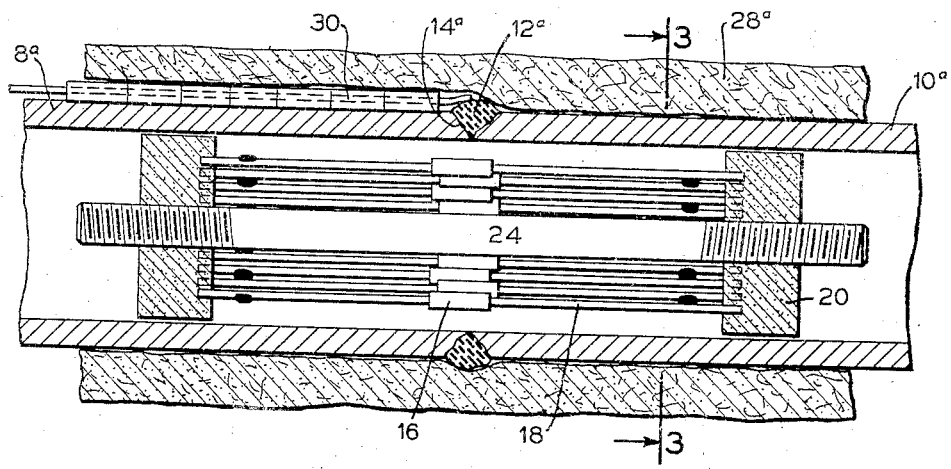
Fig. 2 is a similar view of tubes welded end to end.
Figure 3:
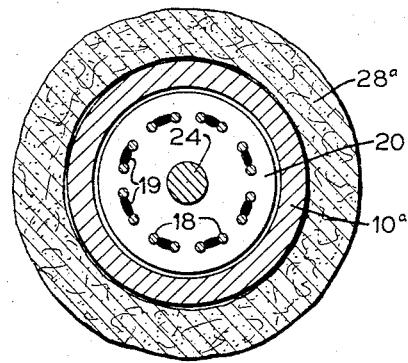
Fig. 3 is a transverse sectional view on the line 3—3 of Fig. 2.

In Fig. 1 of the drawings, the side pipe 8 is welded to the base pipe 10 by the metal 12 deposited in the groove 14 formed between the pipes 8 and 10. In Fig. 2, likewise, the pipe sections 8A and 10A are welded together by deposited metal 12A introduced into the groove 14A.

The same heating device is utilized in Figs. 1 and 2 of the drawings. This heating device, indicated generally at 16, comprises a series of high-resistance heating elements 18 alternately connected to one another at their opposite ends, as indicated at 19, and supported within the insulating plates or discs 20. The heating elements may be connected to the source 22 in series throughout the entire device or may be connected in two or more parallel circuits, dependent upon the potential available and upon the type of heating element employed. The circuits 20 may be connected by the right and left threaded bolt 24 for forming the rigid heating unit.

The outside of the weld is thoroughly insulated for a substantial distance beyond the weld and beyond the heating elements, so that the heat available will be applied most effectively at the weld itself. The insulating boards 20 close off the passages in the tubes 10 and 10A. The passage within the tube 8 may likewise be closed by means of a similar insulator 26. In Fig. 1 a thick insulating layer 28 envelops the tubes 8 and 10 on both sides of the weld 12, the insulator extending beyond the heat device, as shown. Similarly, the weld between the tubes 8A and 10A is enclosed within a heavy layer of insulation 28A so as to preserve the heat mainly at the weld 12A and the adjacent tube members. In order to know accurately the temperature at the weld, a thermocouple should extend within the insulation to a point adjacent the weld 12 or 12A, as indicated at 30.

The apparatus disclosed in Figs. 4 and 5 is of the same general type as in the first form of the invention. In this case, however, the heating device 32 is positioned exteriorly of the tubes 34 and 36 connected by the weld 38. The heating device may be formed of hinged semicylindrical members 40 and 42, hinged together at 44 and adapted to be secured as at 46 in enveloping relation to the welded tubes. As illustrated, the heating elements 48 are supported in the insulating boards 50 and metallic ferrules 52, spaced by means of the semi-cylindrical metallic or insulating elements 54. The sleeves 56 of the ferrules support the heating device upon the tubes 34 and 36. The heating elements 48 are connected to the source 60 in two parallel circuits in this form of the invention, one for each of the semicylindrical units. The entire heating device is surrounded by insulating material 62 extending for a substantial distance beyond the weld 38 and heating elements 48. The interior of the tubes 34 and 36 will be closed off by insulating material (not shown), corresponding to the insulating disks 20 in Fig. 2. A thermocouple 64 is preferably employed as in the first form of the invention.

In Fig. 6 the pipe 66 is attached to the still wall or other plate or large pipe 68 by means of the weld 70. The weld and adjacent pipe and still wall are enveloped by the heating devices 72 and 74 having heating elements both within and without the weld, in the form illustrated. It will be understood that under some conditions only one of these devices is required. The exterior heating device comprises the heating elements 76 mounted on transite board or other rigid insulators 78 and 80, connected together as by means of bolts 82. The elements 76 may be connected in series to the source of power 84 or, if desired, two or more parallel connections may be employed. The heating devices 72 are thoroughly insulated against outside heat loss by means of insulation material 86. For convenience the heating device 72 may be formed in two parts, readily applicable to the pipe, as illustrated in Fig. 5.

The interior heating device comprises the heating elements 88 connected to the source of power 90 and mounted between the disk 92 and cylinder 94 formed of insulating material. The disk 92 and cylinder 94 are rigidly supported on the T bolt 96, the entire inner face of the unit being enclosed within the insulating material 98. An insulator 100 is placed within the tube 66 to prevent excessive loss of heat into the tube 68.

In carrying out the present invention by the apparatus described above, the weld is first formed in the usual manner by depositing molten metal in the grooves formed between the tubes to be joined. The joint and adjacent tubes or wall are then supplied with the annealing devices described above. Electric current is then supplied to the heating elements for heating the weld and adjacent metal to a high temperature below the fusing point of the weld and tubes. In the typical case in which the invention has been employed, wherein tubes containing 4 to 6 per cent chromium are welded by metal having the same chromium content, this metal has a critical temperature in the range of 1375° to 1450° F. The annealing treatment requires that the welded joint be raised somewhat over this temperature, for example, to about 1600° F. The joint is allowed to remain or soak at this temperature for approximately one hour. The temperature may then be lowered uniformly or by stages at the rate of, say, 5° F. per minute until a lower temperature, for example 1350° F., is reached. This temperature should be maintained for a period, for example one-half hour, to permit the metal to more thoroughly set in this semi-cooled condition. Thereafter the temperature should be gradually cooled at a controlled rate until a temperature of approximately 1200° F. is reached. Thereafter more rapid cooling or even air cooling may take place without injury to the weld.

The critical temperature referred to herein is a point where the particles of the metal become sufficiently plastic that the metal particles realign themselves, and stress within the joint is relieved. The critical temperature for a typical steel tube containing from 4 to 6 per cent chromium is from 1350° to 1500° F. Such steel requires a treating temperature of around 1600° F. Where the joint is soaked at this temperature for approximately one hour, the joint assumes a homogeneous unstressed state. Other metals have corresponding critical temperatures.

Due to the complete enclosure of the weld and adjacent metal within the insulating material disclosed, the weld is brought to its maximum temperature and gradually cooled to substantially the same temperature throughout the weld and adjacent metal. It has been found that this tends to the arrangement of the particles of the metal into a homogeneous state, and that there is little or no tendency for the welded pipe joint thereafter to become separated or cracked when the joint is later used in normal operations where, for example, the pipes may be subjected to temperatures from below normal to 1000° F. or higher.

It will be understood that in the apparatus described above the interior or exterior heating units may be employed, whichever is more convenient in the particular location, or under some conditions the units may be placed both within and without the joint for the more effective control of annealing temperatures. It is also obvious that welds in structures having shapes other than those illustrated, can be treated in a similar manner. Thus, a weld between two flat or curved plates such as ship plates or armor can be annealed in accordance with the invention simply by forming the heating elements and the insulating casing so as to conform substantially to the shape of the plates near the welded joint.

While the invention has been illustrated and described as applied in the annealing of welded joints it is also applicable to various other forms of the heat treatment of metals such as alloy steels.

While there are shown and described certain preferred forms of the invention, it will be understood that these are merely illustrative and that the invention is to be limited only in accordance with the appended claims.

We claim:

1. The method of annealing a welded joint formed by metal deposited between steel members, one of which is tubular, said metal and said members consisting of a steel alloy containing about 4 to 6% of a metal selected from the group consisting of chromium and molybdenum, comprising encasing said joint and adjacent portions of said steel members in an insulated electrical heating device snugly fitted against said steel members, supplying electrical current to said device to raise the temperature thereof to approximately 1600° F., and thereafter gradually reducing said temperature by regulated amounts to about 1200° F., interrupted by a soaking period wherein the temperature is maintained temporarily at a point between 1200° and 1600° F.

2. The method of annealing a welded joint formed by metal deposited between steel members, one of which is tubular, said metal and said members consisting of a steel alloy containing about 4 to 6% of a metal selected from the group consisting of chromium and molybdenum, comprising raising the temperature of the weld and adjacent portions of said steel members to about 1600° F., maintaining this temperature for a period sufficient to relieve all stresses in the joint or adjacent steel, gradually reducing the temperature of said weld to approximately 1350° F. and maintaining said last named temperature for not less than several minutes and then gradually reducing the temperature to approximately 1200° F.

SAMUEL H. RANSOM, JR.
GEORGE C. FAIRBAIRN.